US005588039A

United States Patent [19]
Ohkubo et al.

[11] Patent Number: 5,588,039
[45] Date of Patent: Dec. 24, 1996

[54] MOBILE COMMUNICATION SYSTEM CAPABLE OF AVOIDING LOCAL CONGESTION

[75] Inventors: Kazuko Ohkubo; Masahiko Yahagi, both of Tokyo, Japan

[73] Assignee: NEC Corporation, Tokyo, Japan

[21] Appl. No.: 258,815

[22] Filed: Jun. 13, 1994

[30] Foreign Application Priority Data

Jun. 15, 1993 [JP] Japan ................................. 5-143695

[51] Int. Cl.$^6$ ............................................. H04Q 7/22
[52] U.S. Cl. ........................ 379/58; 379/59; 379/60; 455/33.1
[58] Field of Search .............................. 379/58, 59, 60, 379/63; 455/33.1, 33.2, 54.1, 56.1; 370/110.1

[56] References Cited

U.S. PATENT DOCUMENTS 4,833,701  5/1989  Comroe et al. ..................... 379/60
5,036,531  6/1991  Spear .................................. 379/58
5,319,699  6/1994  Kerihuel et al. .................... 379/58

OTHER PUBLICATIONS

K. Kinoshita; "System Network Technology"; IEICE proceeding, vol. 73, No. 8, pp. 812–818, Aug. 1990, Japan.

Primary Examiner—Curtis Kuntz
Assistant Examiner—G. J. Oehling
Attorney, Agent, or Firm—Whitham, Curtis, Whitham & McGinn

[57] ABSTRACT

In a mobile communication system, a plurality of mobile base stations and a home memory station are connected directly to an integrated service digital network (ISDN) without mobile control stations. Connection between the mobile base stations is established by the ISDN.

2 Claims, 7 Drawing Sheets 5,588,039

MOBILE COMMUNICATION SYSTEM CAPABLE OF AVOIDING LOCAL CONGESTION

BACKGROUND OF THE INVENTION

1. Field of the Invention

The present invention relates to a mobile communication system, and more particularly, to the improvement of connection of mobile base stations.

2. Description of the Related Art

A prior art mobile communication system includes a plurality of mobile base stations and a plurality of mobile control stations for carrying out call connection control between the mobile base stations and between the mobile base stations and public switched telephone networks. In this case, the mobile control stations are connected by using private circuits, to thereby speed up the call connection control. This will be explained later in detail.

As the number of mobile control stations is increased, a mesh connection therebetween becomes complex, thus increasing the manufacturing cost. In order to reduce the manufacturing cost, a hierarchical structure of mobile control stations has been adopted (see Kota Kinoshita: "System Network Technology", IEICE Proceeding, Vol. 73, No. 8, p. 814, FIG. 2, August 1990, Japan). In the hierarchical structure of mobile control stations, however, traffic density in upper-side mobile control stations is very large, thus locally creating a congested state therein. This also will be explained later in detail.

SUMMARY OF THE INVENTION

It is an object of the present invention to avoid local congestion in a mobile communication system.

Another object is to reduce the manufacturing cost of the mobile communication system.

According to the present invention, a plurality of mobile base stations and a mobile data base station (home memory station) are connected directly to an integrated service digital network (ISDN) without mobile control stations. Connection between the mobile base stations is established by the ISDN. Thus, the hierarchical mobile control stations which may cause a congested state are not present. Also, the manufacturing cost can be reduced.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, prior art mobile communication systems will be explained with reference to FIGS. 1 and 3.

Figure 1:
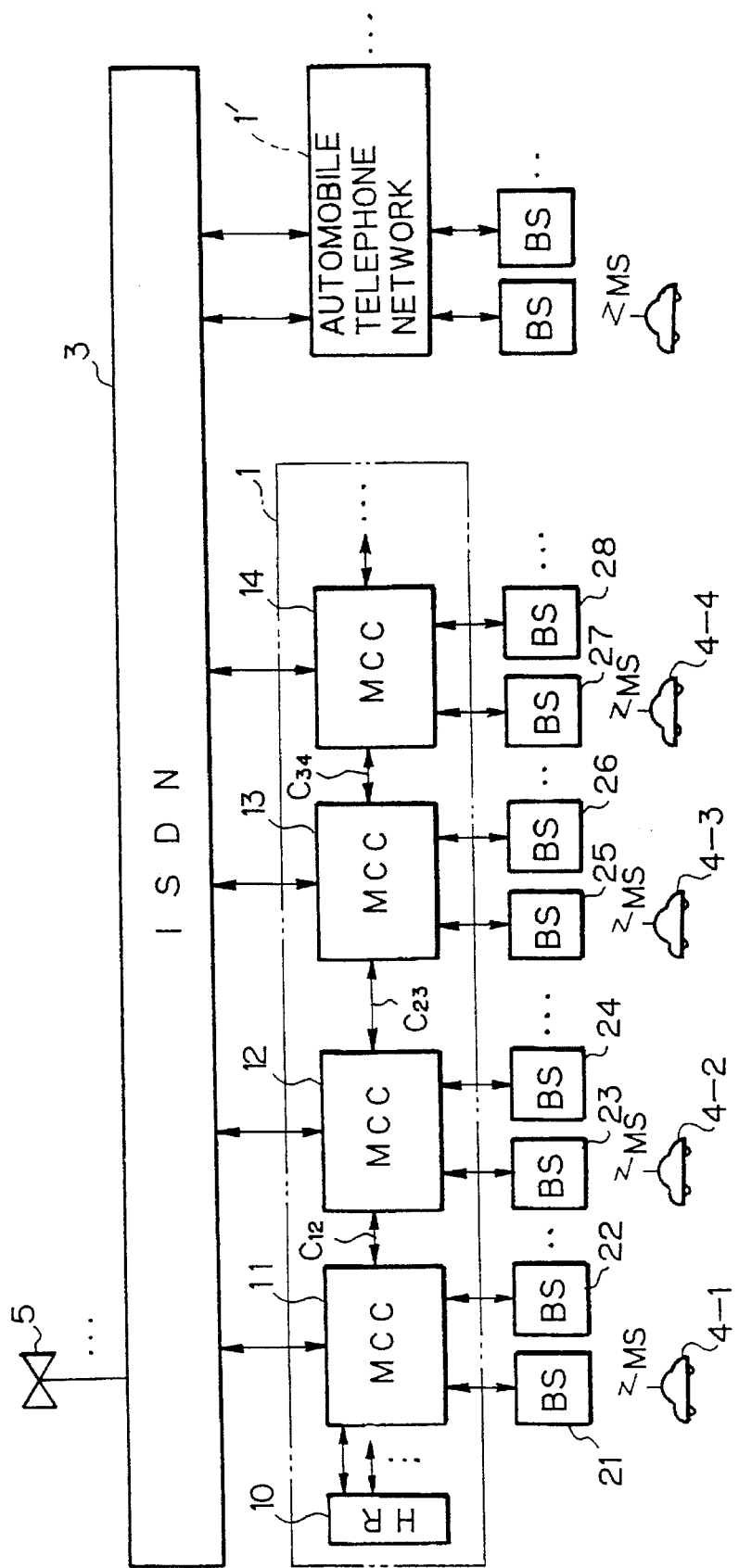
FIG. 1 is a block circuit diagram illustrating a prior art mobile communication system.

In FIG. 1, which illustrates a prior art mobile communication system, reference numerals 1 and 1' designate automobile telephone networks each including a home memory station 10 and a plurality of mobile control stations (MCC) 11, 12, . . . . For example, within the automobile telephone network 1, the mobile control stations 11, 12, . . . are connected by meshed private circuits $C_{12}$, $C_{13}$, . . . . Also, each mobile control station, for example, 11 is connected to a plurality of mobile base stations (BS's) 21, 22, . . . , and to an ISDN 3. That is, when a mobile station (MS) 4-1 requests a call connection to the mobile base station 21, the mobile control station 11 carries out a call connection between the mobile base station 21 and another mobile station in accordance with a content registered in the home memory station 10. For example, if the two mobile base stations belong to the same mobile control station, for example, 11, the mobile control station 11 per se carries out a call connection therebetween. On the other hand, if the two mobile base stations belong to different mobile control stations, such as 11 and 12, the mobile control stations 11 and 12 establish a call connection therebetween by using the private circuit $C_{12}$. Further, a call connection between the mobile station 4-1 and a public telephone network 5 is possible. In this case, the mobile control station 11 establishes a call connection for the ISDN 3 which, in turn, establishes a call connection for the public telephone network 5.

Figure 2A:
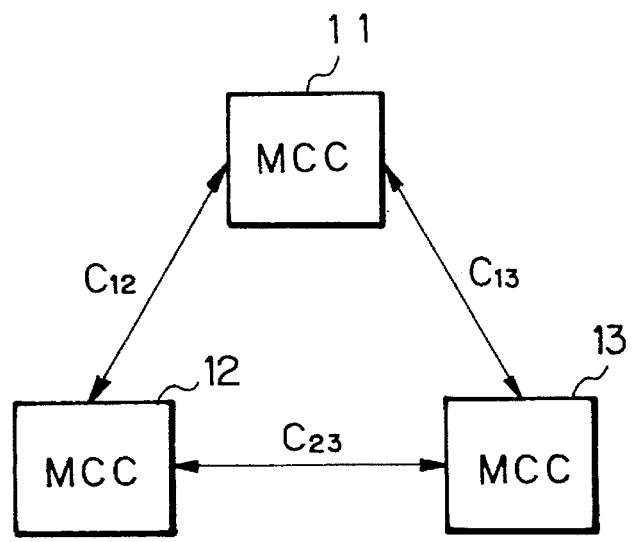
FIGS. 2A and 2B are block circuit diagrams showing examples of the private circuits of FIG. 1.
Figure 2B:
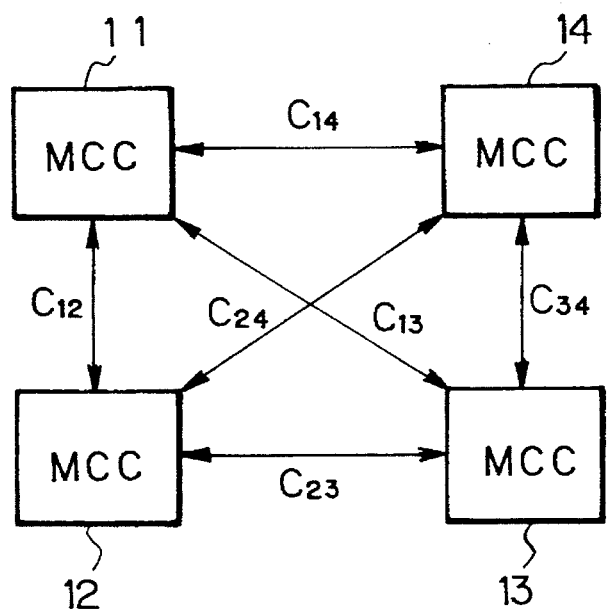

In the prior art mobile communication system of FIG. 1, however, as explained above, since all of the mobile control stations within each of the automobile telephone networks are connected by private circuits, i.e., mesh connections such as $C_{12}$, if the number of mobile base stations is increased to increase the number of the mobile control stations, the mesh connections therebetween become complex. For example, if the number of mobile control stations is 3, the number of mesh connections is 3, as shown in FIG. 2A. Also, if the number of mobile control stations is 4, the number of mesh connections is 6, as shown in FIG. 2B. That is, when the number of mobile control stations is increased, the mesh connections therebetween become remarkably complex. This increases the manufacturing cost.

Figure 3:
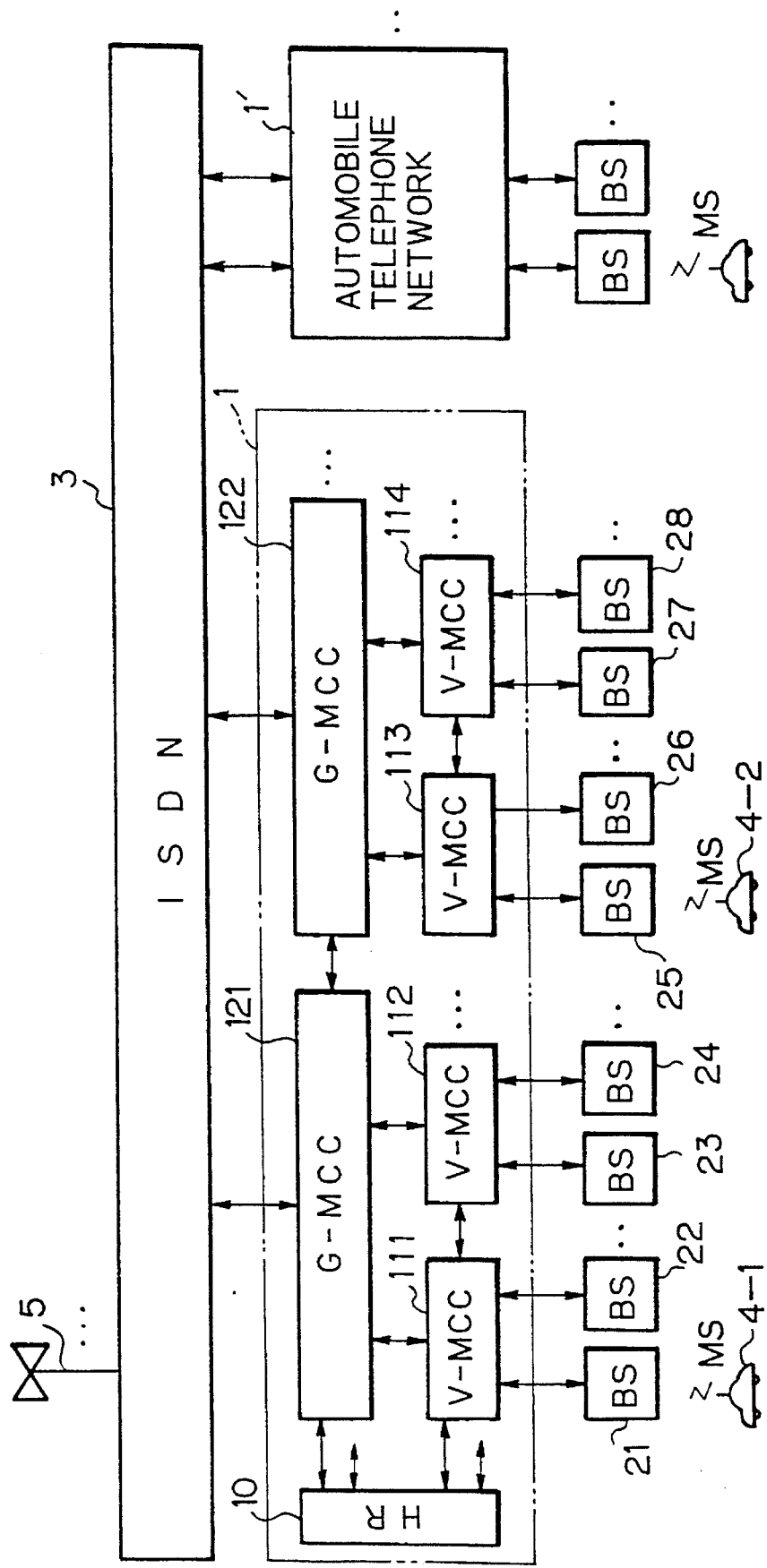
FIG. 3 is a block circuit diagram illustrating another prior art mobile communication system.

In FIG. 3, which illustrates another prior art mobile communication system, a hierarchical structure of mobile control stations, such as a double-layer mobile control station structure, is adoped, to thereby simplify the mesh connections therebetween (see the above-mentioned document). That is, a lower layer is constructed by lower mobile control stations 111, 112, . . . , 113, 114, . . . , and an upper layer is constructed by upper mobile control stations 121, 122, . . . . When the mobile base station 21 requests from the lower mobile control station 111 a call connection for a destination, the lower mobile control station 111 determines whether or not the destination belongs to the lower mobile control station 111 in accordance with the content registered in the home memory station 10. If so, the lower mobile control station 111 per se establishes a call connection. Otherwise, the lower mobile control station 111 determines whether or not the destination belongs to another lower mobile control station, such as 112, in accordance with the content registered in the home memory station 10. If so, the lower mobile control station 111 and the other lower mobile control station, such as 112, establish a call connection by using the private circuit therebetween. Otherwise, the upper mobile control station 121 determines whether or not the destination belongs to the another upper mobile control station, such as 122, in accordance with the content registered in the home memory station 10. If so, the upper mobile control station 111 and the other upper mobile control station, such as 122, establish a call connection by using the private circuit therebetween. Otherwise, the upper mobile control station 121 determines whether or not the destination belongs to the public telephone network 5 in accordance with the content registered in the home memory station 10. If so, the upper mobile control station 121 per se establishes a call connection. Otherwise, the call connection is established by the ISDN 3 including the corresponding mobile control stations.

In the mobile communication system of FIG. 3, however, as explained above, a congested state may be locally created in the upper mobile control stations, such as 121 and 122. For example, a call connection between the mobile base stations 21 and 25 is established by the upper mobile control stations 121 and 122 in addition to the lower mobile stations 111 and 113.

Figure 4:
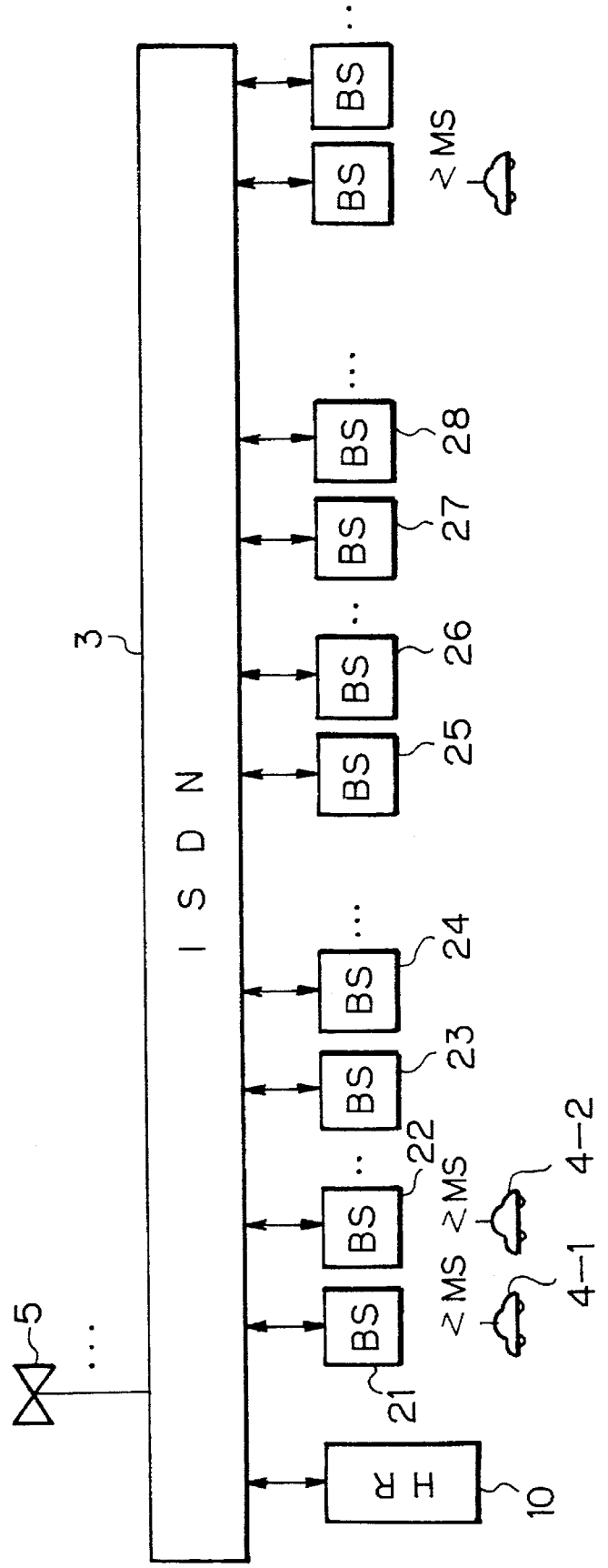
FIG. 4 is a block circuit diagram illustrating an embodiment of the mobile communication system according to the present invention.

In FIG. 4, which illustrates an embodiment of the mobile communication system according to the present invention, the mobile base stations 21, 22, . . . are connected directly to the ISDN 3, and the home memory station 10 is also connected directly to the ISDN 3. Therefore, one ISDN subscriber number is allocated to each of the mobile base stations 21, 22, . . . , and also, one IDSN subscriber number is allocated to the home memory station 10.

Note that the home memory station 10 stores update location information of the mobile stations 4-1, 4-2, . . . , regarding the mobile base stations 21, 22, . . . . One identification number is allocated to each of the mobile stations 4-1, 4-2, . . . . Also, one mobile station can be included in one or more of the mobile base stations 21, 22, . . . .

Figure 5:
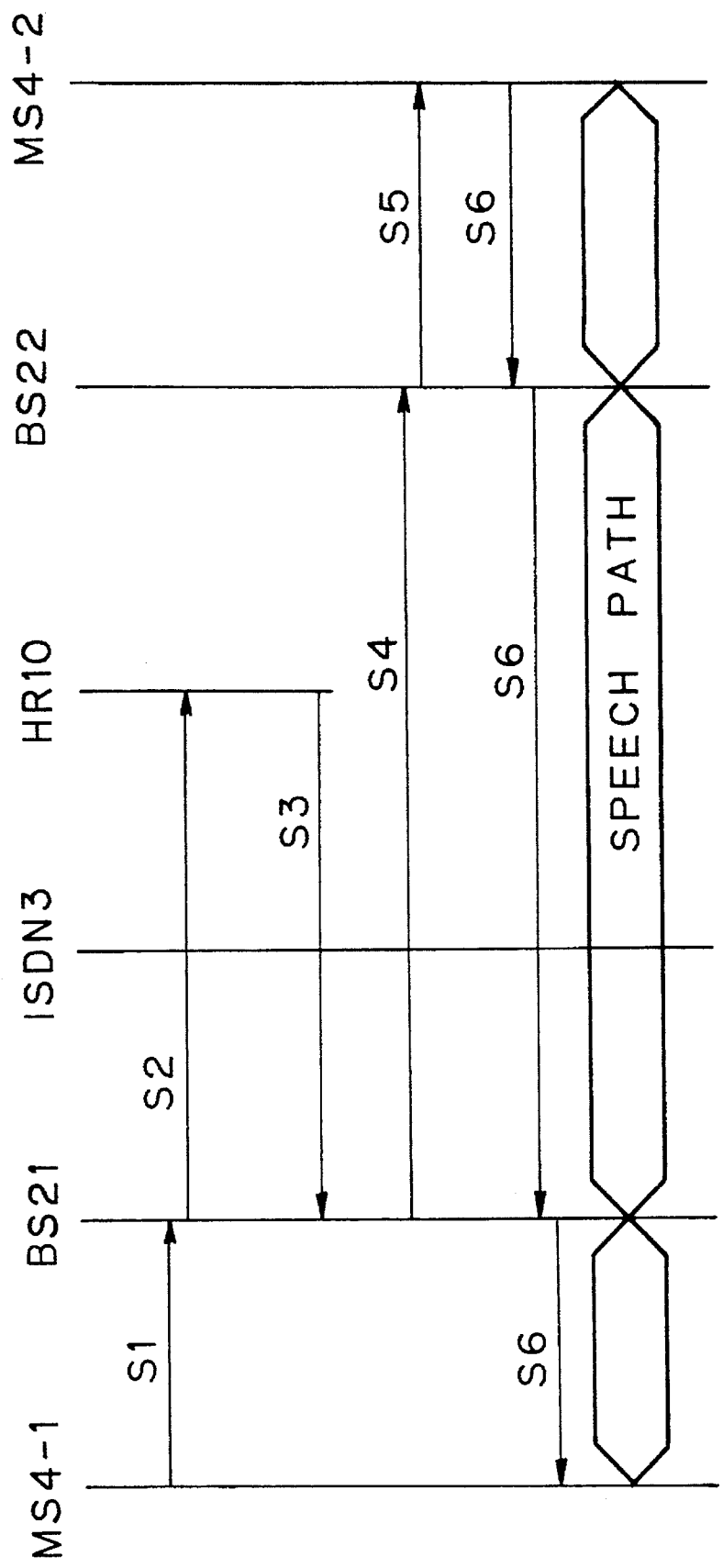
FIGS. 5, 6 and 7 are sequence diagrams showing the operation of the system of FIG. 4.

The operation of the system of FIG. 4 will be explained next with reference to FIGS. 5, 6 and 7. FIG. 5 shows a case where a destination is included in only one mobile base station, FIG. 6 shows a case where a destination is included in three mobile base stations, and FIG. 7 shows a case where a destination is included in the public telephone network 5.

First, a mobile station such as 4-1 transmits a call request S1 with a destination subscriber number to the mobile base station 21. Then, the mobile base station 21 transmits a call information signal S2 including the identification number of the mobile station 4-1 and the destination subscriber number via the ISDN 3 to the home memory station 10. As a result, the home memory station 10 searches for the destination subscriber number in the content registered therein.

As a result of the search by the home memory station 10, if the destination subscriber number is included in, i.e., belongs to only the mobile base station 22, as shown in FIG. 5, the home memory station 10 returns an information signal S3 including the ISDN subscriber number of the mobile base station 22 and the identification number of a destination subscriber via the ISDN 3 to the mobile base station 21. Then, the mobile base station 21 establishes a call connection S4 to the mobile base station 22 by using the ISDN subscriber number thereof, and as a result, the mobile base station 22 calls a mobile station such as 4-2 having the desired destination identification number by a radio signal S5, and awaits a response from the mobile station 4-2. If a response signal S6 is generated from the mobile station 4-2 to the mobile base station 22, the response signal S6 is transmitted via the ISDN 3 and the mobile base station 21 to the mobile station 4-1, so that a speech path is established between the mobile stations 4-1 and 4-2.

Figure 6:
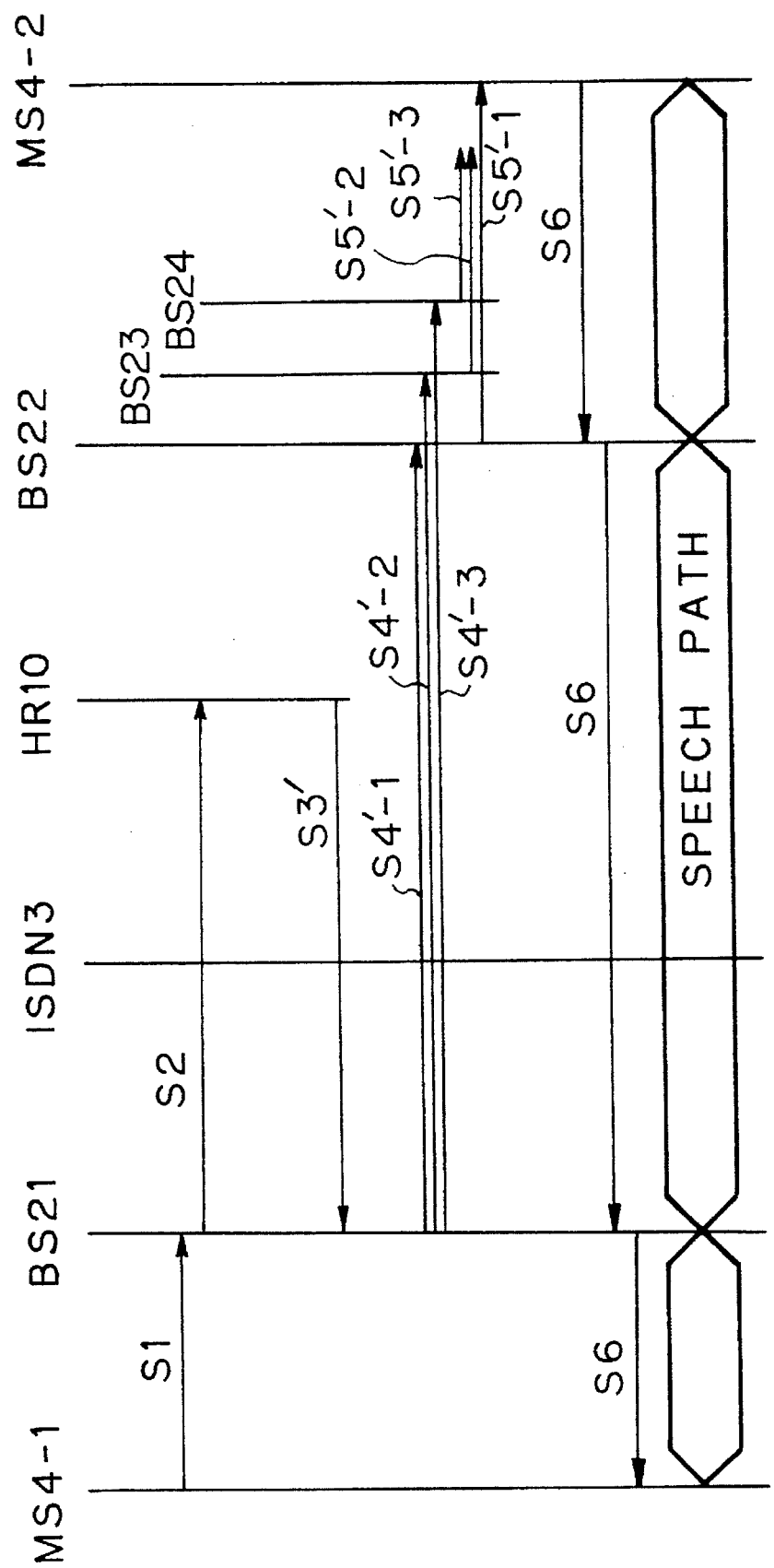
Figure 7:
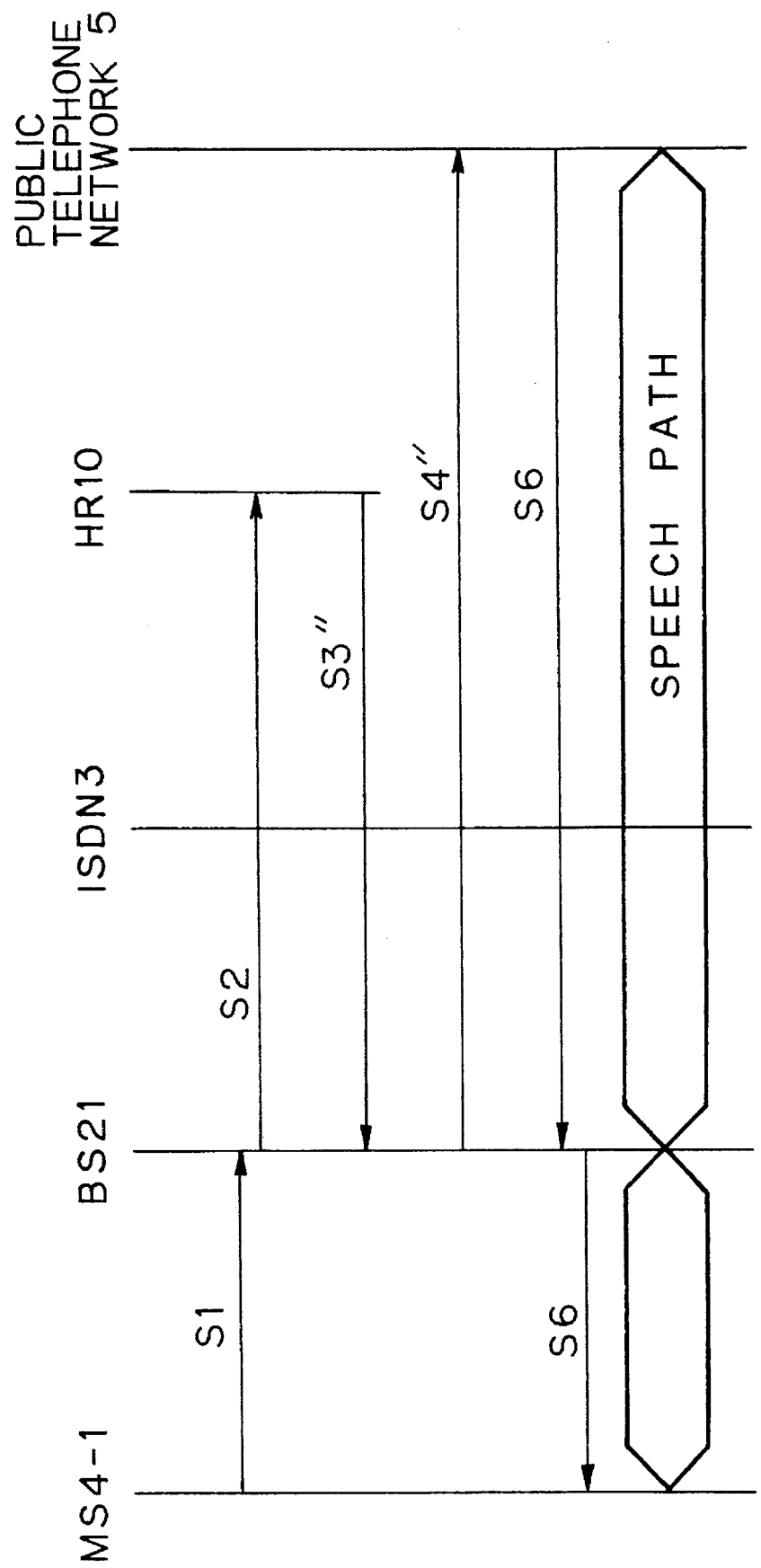

As a result of the search by the home memory station 10, if the destination subscriber number is included in, i.e., belongs to the three mobile base stations 22, 23 and 24, as shown in FIG. 6, the home memory station 10 returns an information signal S3' including the ISDN subscriber numbers of the mobile base stations 22 and the identification number of a destination subscriber via the ISDN 3 to the mobile base station 21. Then, the mobile base station 21 establishes call connections S4'-1, S4'-2 and S4'-3 to the mobile base stations 22, 23 and 24 by using the ISDN subscriber numbers thereof, and as a result, the mobile base stations 22, 23 and 24 call a mobile station, such as 4-2 having the desired destination identification number by radio signals S5'-1, S5'-2 and S5'-3, and await a response from the mobile station 4-2. If a response signal S6 is generated from the mobile station 4-2 to the mobile base station 22, the response signal S6 is transmitted via the ISDN 3 and the mobile base station 21 to the mobile station 4-1, so that a speech path is established between the mobile stations 4-1 and 4-2.

As a result of the search by the home memory station 10, if the destination subscriber number is included in, i.e., belongs to the public telephone network 5, as shown in FIG. 7, the home memory station 10 returns an information signal S3" including the ISDN subscriber number of the public telephone network 5 via the ISDN 3 to the mobile base station 21. Then, the mobile base station 21 establishes a call connection S4" to the public telephone network 5 by using the ISDN subscriber number thereof and awaits a response from the public telephone network 5. If a response signal S6 is generated from the public network telephone 5 to the mobile base station 22, the response signal S6 is transmitted via the ISDN 3 and the mobile base station 21 to the mobile station 4-1, so that a speech path is established between the mobile station 4-1 and the public telephone network 5.

As explained hereinbefore, according to the present invention, since the mobile base stations and the home memory station are connected directly to the ISDN as ISDN subscribers thereof, without hierarchical mobile control stations, a connection between the mobile base stations is established by the ISDN, so that no congestion is created. Also, since the mobile control stations are not present, the mobile communication system can be reduced in cost.

We claim:

1. A mobile communication system comprising:

an integrated service digital network (ISDN);

a plurality of mobile base stations directly connected to said ISDN as subscribers of said ISDN, each of said mobile base stations comprising means for receiving a call request with a destination subscriber number from one of a plurality of mobile stations, and means for transmitting to said ISDN a call information signal including an identification of said one of said mobile stations and the destination subscriber number;

a home memory station, directly connected to said ISDN as a subscriber of said ISDN, for storing update location information of said plurality of mobile stations with respect to said mobile base stations, said home memory station comprising:

(i) means for receiving said call information signal and for searching the stored update location information to determine to which mobile base stations the destination subscriber number belongs, and (ii) means for returning an information signal including an ISDN subscriber number of at least one of said mobile base stations to which the destination subscriber number belongs and an identification number of the destination subscriber number via said ISDN to said one of said mobile base stations, wherein each of said mobile base stations further comprises:
  (i) means for receiving said information signal and for establishing a call connection to at least one of said mobile base stations, without passing through said home memory station, based on the ISDN subscriber number thereof, and
  (ii) means for calling one of said mobile stations having the identification number of the destination subscriber number.

2. A mobile communication system comprising:

an integrated service digital network (ISDN);

a plurality of mobile base stations directly connected to said ISDN as subscribers of said ISDN, each of said mobile base station comprising:
  (i) means for receiving a call request with a destination subscriber number from one of a plurality of mobile stations, and
  (ii) means for transmitting a call information signal including an identification of said one of said mobile stations and the destination subscriber number to said ISDN:

at least one public telephone network directly connected to said ISDN as a subscriber of said ISDN; and a home memory station, directly connected to said ISDN as a subscriber of said ISDN, for storing update location information of said plurality of mobile stations with respect to said mobile base stations, said home memory station comprising
  (i) means for searching for the destination subscriber number, to determine whether the destination subscriber number belongs to said public telephone network; and
  (ii) means for returning an information signal, including an ISDN subscriber number of said public telephone network and an identification number of the destination subscriber number via said ISDN to said one of said mobile base stations, when the destination subscriber number belongs to said public telephone network; and wherein each of said mobile base stations further comprises means for establishing a call connection to said public telephone network by using the ISDN subscriber number thereof without passing through said home memory.

* * * * *